United States Patent [19]

Petty, Byron

[11] Patent Number: 4,955,499

[45] Date of Patent: Sep. 11, 1990

[54] RECEPTACLE UPDATE DEVICE

[75] Inventor: Petty, Byron, San Carlos, Calif.

[73] Assignee: Fiberlite, San Carlos, Calif.

[21] Appl. No.: 274,424

[22] Filed: Nov. 21, 1988

[51] Int. Cl.$^5$ .................. B65D 6/24; B65D 90/06; A01G 9/02

[52] U.S. Cl. .................. 220/4 E; 47/66; 47/72; 312/204; 220/453

[58] Field of Search .................. 220/4 B, 4 E, 453; 47/66, 72; 312/204, 210

[56] References Cited

U.S. PATENT DOCUMENTS

| | | |
|---|---|---|
| 1,959,800 | 5/1934 | Rogge . |
| 2,589,699 | 3/1952 | Johnson .................. 312/210 |
| 2,956,915 | 10/1960 | Korn .................. 220/453 |
| 3,047,183 | 7/1962 | Papa .................. 47/66 |
| 3,475,858 | 11/1969 | Flannigan . |
| 3,588,212 | 6/1971 | Gersch . |
| 3,764,034 | 10/1973 | Klugman .................. 220/4 E |
| 3,906,664 | 9/1975 | Hall .................. 47/66 |
| 4,538,378 | 9/1985 | Roige .................. 47/72 |
| 4,546,900 | 10/1985 | Lackey .................. 220/453 |
| 4,702,390 | 10/1987 | Rinkovsky .................. 47/66 |

FOREIGN PATENT DOCUMENTS 2611129 8/1988 France .................. 47/72

*Primary Examiner*—George E. Lowrance
*Attorney, Agent, or Firm*—Irell & Manella

[57] ABSTRACT

A device and method for restoring or changing the external appearance of a receptacle, and preferably a planter box refuse container of the like, is disclosed. The device for updating these receptacles is made up of a plurality of joinable substantially rigid composite sheet sections which are sized so that their inner surface substantially conform in dimension to the outer surfaces of the original receptacle and extend over the top surface of the original receptacle. In preferred embodiments the device is formed in two sections each of which surrounds and closes half of the perimeter of the receptacle with the two sections being joined at their respective ends to complete the enclosure.

8 Claims, 1 Drawing Sheet

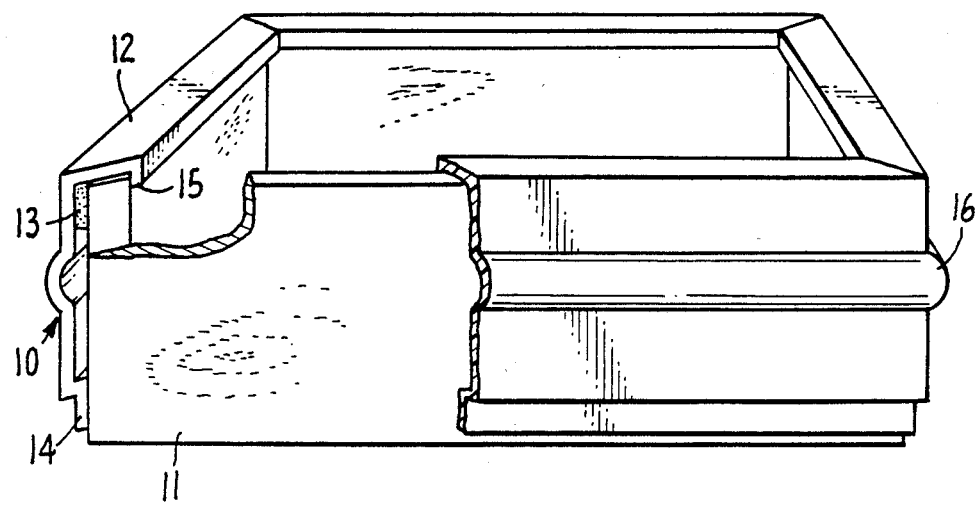
FIG. 1.
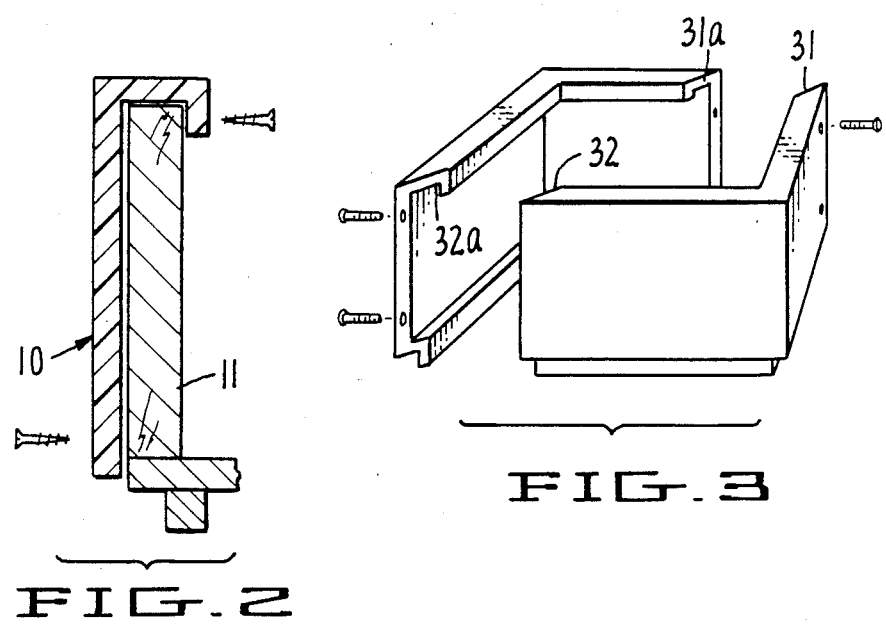
FIG. 2.
FIG. 3

RECEPTACLE UPDATE DEVICE

BACKGROUND OF THE INVENTION

1. Field of the Invention

This invention relates to an improvement to public receptacles such as planter boxes, waste containers, and the like. More particularly, it relates to updating these receptacles to overcome appearance defects arising from vandalism and age.

2. Background Information

Planter boxes for holding small trees, flowers and shrubs; waste receptacles and other fixtures are a common and architecturally significant factor in the design of many public buildings, ranging from shopping centers to hospitals to schools and the like. They can represent a significant investment. Unfortunately, in the case of planter boxes, the passage of time can have two diametrically opposed effects. On the one hand, the passage of time leads to establishment and maturation of the plants contained within the planter such that they become an increasingly important part of the architectural environment. Such plants become quite heavy and difficult to relocate. The other effect of time is that the planter boxes, as well as other similar receptacles, while still retaining good structural integrity, become physically unattractive. This can be due to changes of style or decor within their setting or, commonly, can arise from vandalism and other disuse.

One solution, is to replace the outmoded or defaced receptacles. This is expensive, and in the case of large well grown out foliage difficult and disruptive.

An alternative, is to attempt to restore the existing receptacles by repainting, replastering and the like. This can be very time consuming and generally leads to a relatively shoddy appearing final product which is often inconsistent with the image projected by upscale users.

The present invention provides a way to solve this problem of outdated or damaged receptacles. The present invention's solution does not required the dismantling or replacement of the existing receptacles and is much lower in cost than replacement.

Patents relating to planters and other similar receptacles include U.S. Pat. No. 3,475,858 issued to W.J. Flannigan on Nov. 4, 1969 and U.S. Pat. No. 1,959,800 issued to B. Rogge on May 22, 1934. Another patent of interest is U.S. Pat. No. 3,588,212 issued to Richard G. Gersch and Kip J. Hoag on June 28, 1971.

STATEMENT OF THE INVENTION

A device and method for restoring or changing the external appearance of a receptacle, such as a planter box, refuse container or the like, has now been found. A receptacle suitable for updating by the present invention may be characterized as having a substantially vertical external wall which defines its original shape. This wall at its top end connects to an upper horizontal surface and defines a rim which surround an opening into which refuse may be thrown or plants may grow in the case of refuse containers or planter boxes. The update device is made up of a plurality of joinable, substantially rigid composite sheet sections. These sections have an outer surface, which defines the new updated appearance of the receptacle. They also have an inner surface and a top lip. The sheets are sized so that the inner surface substantially conforms in dimension to the outer surface of the original receptacle with the top lip extending over the upper horizontal surface of the receptacle into the opening, thereby substantially completely covering the external surface of the original receptacle. Thus when the several sections are joined, they substantially surround and enclose the external surface of the original receptacle.

In a preferred embodiment, the device employs two sections. These sections each correspond to approximately half the circumference of the receptacle such that when they are joined, at diagonally positioned corners, they work to surround and enclose the planter box or other receptacle.

In another aspect, this invention provides a method for restoring or changing the external appearance of a receptacle which method comprises adhering to the external surface of the receptacle the above-described sections and joining the sections to one another so as to form a single unit surrounding and enclosing the external surface of the original receptacle.

DETAILED DESCRIPTION OF THE INVENTION

BRIEF DESCRIPTION OF THE DRAWINGS

This invention will be further described with reference being made to the accompanying drawings. In these drawings, FIG. 1 is a partially cut away perspective view of a planter box with a receptacle update device of the invention attached thereto;

FIG. 2 is cross-sectional view illustrating a planter update device in place on a receptacle wall; and FIG. 3 is an exploded view of a preferred embodiment of the receptacle update device of this invention.

MODES FOR CARRYING OUT THE INVENTION

Turning now to FIG. 1, a planter box update device 10 is illustrated attached to planter 11. Planter update device 10 can be seen to surround planter box 11. Update device 10 includes an upper surface 12 which terminates in lip 15. This fits over the top of the edge of planter box 11, completely and continuously covering the top of the planter box. Update device 10 is affixed to the planter box such as by means of adhesives, for example mudding 13. It can be seen that update device 10 is designed to tightly contact planter box 11 at its lower surface, for example, at area 14. Another feature of update device 10 is its ability to change or improve the appearance of the planter box. This is shown representationally by deco strip 16 which is cast into the update device.

Planter box 10 is generally fabricated of reinforced plastic. This reinforcement can take the form of fiber glass or the like. The plastic can be epoxy resin or it can be any other reinforceable plastic material. The thickness of the wall of planter box update 10 should be such as to present a relatively sturdy appearance. Typically thicknesses of at least about ⅛ of an inch are used with thickness from about ⅛ to ½ of an inch being preferred.

FIG. 2 illustrates in more detail the fitting of the planter box update 10 to the planter box 11. Again, as shown in FIG. 1, update 10 fits over and surrounds the top of the edge of planter box 11. Update 10 is sized to closely conform to the dimensions of planter 11, as illustrated in FIG. 2. Not shown in FIG. 2 is the means of fixing the planter box update to the planter box. Adhesives such as epoxy resins and plasterers mud can work to affix the update device. Screws may also be used as well as other equivalent fastening devices.

Turning to FIG. 3 a preferred embodiment of the invention is shown. In this embodiment the update device is formed in two pieces, each of which covers essentially one half the circumference of the planter being covered. As can be seen by FIG. 3, this configuration allows the update device to be fitted to the planter with minimum on site hand work. All that needs to be done is that the mitered corners 31, 31a, 32 and 32a be cut and then the two pieces be assembled to give a rigid unit. This configuration has the advantages of being easy to use and quite durable and resistant to vandalism and other damage.

In this embodiment, the two halves of the planter update are fastened together at their respective ends. Screws are illustrated in FIGS. 2 and 3 as a representative means for accomplishing this, while glues and adhesives and the like can also be used.

While the invention has been described with reference to a rectangular or square planter box, it will be appreciated that alternatively the receptacle update could be used with a trash container or similar receptacle. In such cases the update unit might very well be round in shape and have two parts each having a semicircular cross section. The types of surfaces to which the receptacle update panels can be applied include wood, fiberglass, precast concrete and the like.

The receptacle update panels, in a preferred embodiment, are a composite of an outer gelcoat layer (30–50 mils in thickness). The next layer is a fiberglass reinforced epoxy sprayed up on the gelcoat as a chopped material generally about 1/32 to 1/16 of an inch in thickness. This layer is then topped with a ⅛ inch thick layer of corrugated cardboard, followed by a final layer of resin and chopped fiberglass. These various layers are applied to the inner surface of a mold with the gelcoat being first, the panel is cured in the mold for 4 to 16 hours and then removed. The gelcoat layer can contain the color desired for the finished product and can give a high quality glossy outer surface. If desired, sand or other texturing material could be added to the gelcoat layer to give a suitable decorative outer finish. The two panels are joined together at their corners. It is possible to add a sealant at these corners to give a continuous smooth one piece appearance to the receptacle update device.

A major advantage of the present invention is its ability to conserve resources and to save money. This is shown dramatically by the following comparison. An estimate of comparative cost for replacing 30 4ft and 5ft by 3ft high precast planters; 30 3ft and 4ft diameter 2ft high precast planters and 30 circular ashurns also made of precast concrete was prepared and compared to the cost of storing these units with the panels of this invention. The cost of removing and disposing of the original planters was estimated to be $50,000. The cost of replacing the planters was estimated at $63,000, with a labor cost of this work, plus replanting the planters of $51,500 giving a total of $164,500. In contrast, the 40 rectangular and square precast planters could be recovered using the present invention at an average cost of $650 each or a total of $25,000. The 30 round planters could be covered for a cost of $400 per planter or a total of $12,000 and the 30 ashurns could be recovered for $225 each or a total cost of $6,750. The total estimated labor for installing these hundred units was estimated as $10,000 or a total of $53,750. The recovering had the additional advantage of permitting mature tress and shrubs to be retained without disruption.

As can be seen the present invention provides real economic advantage to the user. The resulting product presents a superior appearance.

While the invention has been described with reference being made to certain preferred embodiments it will be appreciated by those skilled in the art that one may make modifications to this invention without departing from its essential spirit and the invention as defined by the following claims:

What is claimed is:

1. An updated architectural receptacle comprising in combination an architectural receptacle and a receptacle update device for restoring or changing the external appearance of said receptacle, said receptacle having a substantially vertical wall defining its original shape, an upper horizontal surface at the top of the vertical wall with an opening in said horizontal surface, the update device being affixed to the external surface of said receptacle and comprising two joined substantially rigid composite sheet sections, each of said sections corresponding substantially to half the perimeter of said receptacle said sections having an outer surface, an inner surface and a top lip, the sheet sections being sized so that the inner surface substantially conforms in dimension to the vertical wall of the receptacle with the top lip extending over the upper horizontal surface into said opening, said two sheet sections, as joined, substantially surrounding and enclosing the vertical wall and horizontal surface of said receptacle.

2. The updated architectural receptacle of claim 1 wherein the receptacle is a planter box.

3. The updated architectural receptacle of claim 1 wherein the receptacle is a refuse container.

4. The updated architectural receptacle of claim 1 wherein said composite sheet sections are plastic laminates.

5. The updated architectural receptacle of claim 1 wherein said sections are affixed to the external surface of the receptacle by means of adhesive.

6. The updated architectural receptacle claim 6 wherein said adhesive comprises plasterer's mud.

7. The updated architectural receptacle of claim 1 wherein said two sections surround the receptacle with their ends in abutment and wherein the two sections are joined together at the point of abutment.

8. A method for updating an architectural receptacle, said receptacle having a substantially vertical wall defining its original shape, an upper horizontal surface at the top of the vertical wall with an opening in said horizontal surface, comprising
   attaching to said vertical wall and said upper horizontal surface two joinable substantially rigid composite sheet sections, each of the two sections having an outer surface, an inner surface and a top lip, the sheet sections being sized so that the inner surface substantially conforms in dimension to the vertical wall of the receptacle with the top lip extending over the upper horizontal surface into said opening, each of said sections corresponding substantially to half the perimeter of said receptacle such that the two sheet sections abut one another at their ends and, when joined, substantially surround and enclose the external surface of the original receptacle, and
   joining the two sheet sections to one another at their points of abutment.

* * * * *